(12) United States Patent
Branson et al.

(10) Patent No.: US 9,253,059 B2
(45) Date of Patent: *Feb. 2, 2016

(54) DEPLOYING AN EXECUTABLE WITH HISTORICAL PERFORMANCE DATA

(71) Applicant: International Business Machines Corporation, Armonk, NY (US)

(72) Inventors: Michael J. Branson, Rochester, MN (US); John M. Santosuosso, Rochester, MN (US); Brandon W. Schulz, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/709,438

(22) Filed: Dec. 10, 2012

(65) Prior Publication Data

US 2013/0198371 A1     Aug. 1, 2013

Related U.S. Application Data

(63) Continuation of application No. 13/363,647, filed on Feb. 1, 2012.

(51) Int. Cl.
*H04L 12/26* (2006.01)
*G06F 17/30* (2006.01)
*G06F 9/50* (2006.01)

(52) U.S. Cl.
CPC ............... *H04L 43/08* (2013.01); *G06F 9/505* (2013.01); *G06F 9/5044* (2013.01); *G06F 9/5055* (2013.01); *G06F 9/5088* (2013.01); *G06F 17/30516* (2013.01); *G06F 2209/508* (2013.01)

(58) Field of Classification Search
CPC ..... G06F 9/5088; G06F 9/505; G06F 9/5044; G06F 9/5055; H04L 43/08
USPC ........................................................ 709/224
See application file for complete search history.

(56) References Cited

U.S. PATENT DOCUMENTS

| | | |
|---|---|---|
| 6,622,221 B1 | 9/2003 | Zahavi |
| 7,376,654 B1 | 5/2008 | Chau et al. |
| 7,797,062 B2 | 9/2010 | Discenzo et al. |
| 2003/0061004 A1 | 3/2003 | Discenzo |
| 2005/0071834 A1 | 3/2005 | Gates et al. |
| 2006/0070060 A1 | 3/2006 | Tantawi et al. |

(Continued)

OTHER PUBLICATIONS

International Search Report and Written Opinion of the ISA dated Jun. 3, 2013—International Application No. PCT/EP2013/051015.

(Continued)

*Primary Examiner* — Brian J Gillis
*Assistant Examiner* — Juan C Turriate Gastulo
(74) *Attorney, Agent, or Firm* — Patterson & Sheridan, LLP

(57) ABSTRACT

Techniques for incorporating performance data into an executable file for an application are described. Embodiments monitor performance of an application while the application is running. Additionally, historical execution characteristics of the application are determined based upon the monitored performance and one or more system characteristics of a node on which the application was executed on. Embodiments also incorporate the historical execution characteristics into executable file for the application, such that the historical execution characteristics can be used to manage subsequent executions of the application.

7 Claims, 7 Drawing Sheets

(56) References Cited

U.S. PATENT DOCUMENTS

| | | | |
|---|---|---|---|
| 2007/0240137 A1* | 10/2007 | Archambault et al. | 717/140 |
| 2008/0126761 A1* | 5/2008 | Fontenot et al. | 712/225 |
| 2008/0216055 A1* | 9/2008 | Khatutsky | 717/127 |
| 2009/0150874 A1 | 6/2009 | Chung et al. | |
| 2009/0204237 A1 | 8/2009 | Sustaeta et al. | |
| 2009/0271807 A1* | 10/2009 | Barsness et al. | 719/330 |
| 2009/0300615 A1* | 12/2009 | Andrade et al. | 718/100 |
| 2010/0205137 A1* | 8/2010 | Barsness et al. | 706/52 |
| 2011/0295984 A1* | 12/2011 | Kunze | 709/220 |
| 2012/0041914 A1* | 2/2012 | Tirunagari | 706/15 |
| 2012/0197962 A1* | 8/2012 | Maenpaa et al. | 709/201 |

OTHER PUBLICATIONS

Bugra Gedik et al., "SPADE: The System S Declarative Stream Processing Engine", SIGMOD '08, Jun. 9-12, 2008, Vancouver, BC, Canada, pp. 1123-1134.

U.S. Appl. No. 13/363,647, entitled "Deploying an Executable With Historical Performance Data", filed Feb. 1, 2012.

* cited by examiner

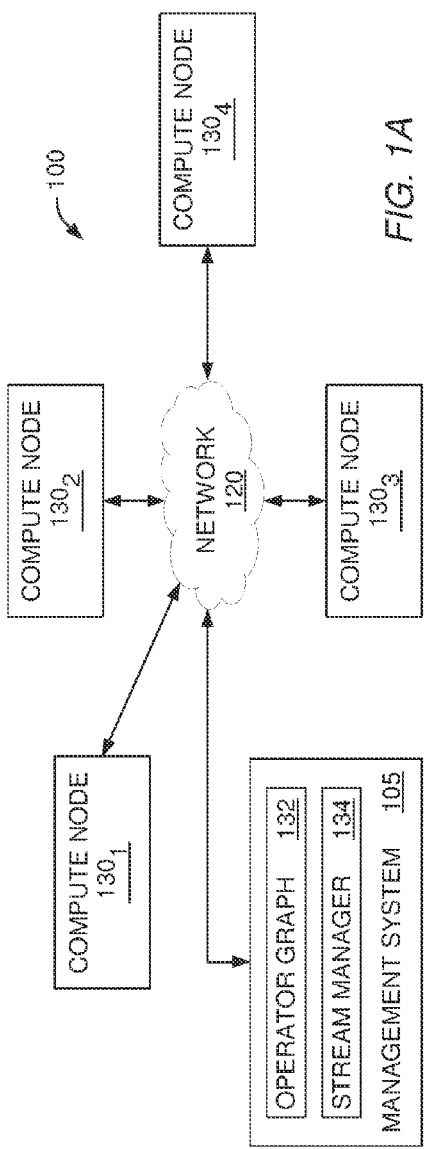
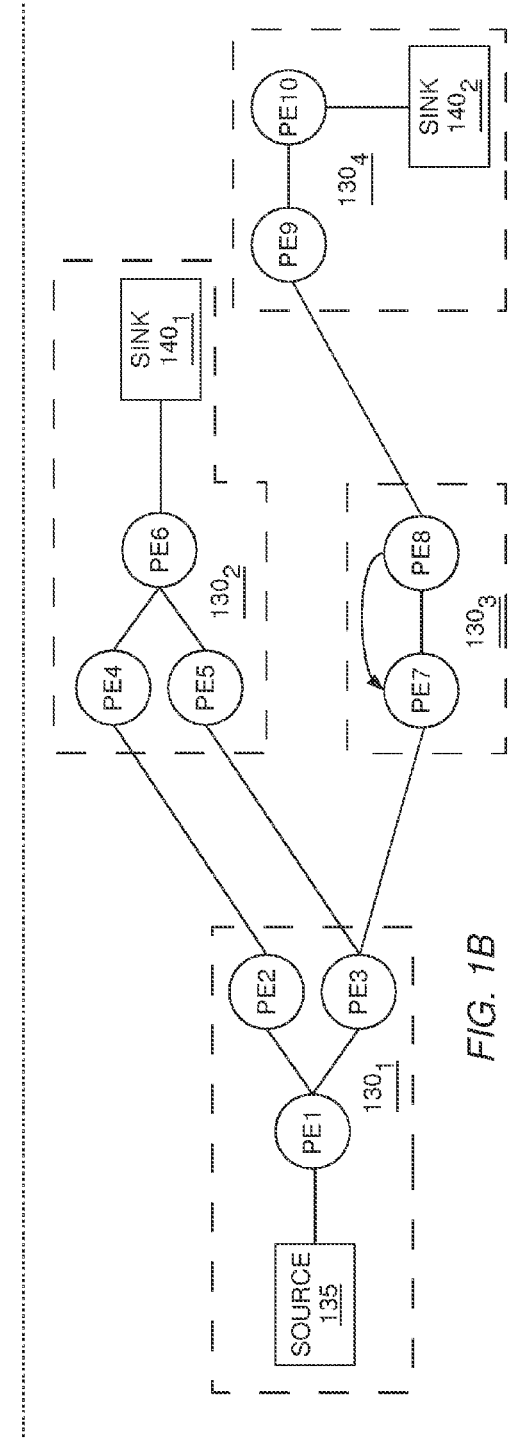
FIG. 1A
FIG. 1B

DEPLOYING AN EXECUTABLE WITH HISTORICAL PERFORMANCE DATA

CROSS-REFERENCE TO RELATED APPLICATIONS

This application is a continuation of co-pending U.S. patent application Ser. No. 13/363,647, filed Feb. 1, 2012. The aforementioned related patent application is herein incorporated by reference in its entirety.

BACKGROUND

Embodiments of the present invention generally relate to managing applications. Specifically, the invention relates to packaging an executable with performance information for use in managing execution of the executable.

While computer databases have become extremely sophisticated, the computing demands placed on database systems have also increased at a rapid pace. Database systems are typically configured to separate the process of storing data from accessing, manipulating or using data stored in the database. More specifically, databases use a model where data is first stored, then indexed, and finally queried. However, this model cannot meet the performance requirements of some real-time applications. For example, the rate at which a database system can receive and store incoming data limits how much data can be processed or otherwise evaluated. This, in turn, can limit the ability of database applications to process large amounts of data in real-time.

SUMMARY

Embodiments provide a method, system, and computer program product for incorporating performance data into an executable file for an application. The method, system, and computer program product include monitoring performance of an application while the application is running Additionally, the method, system, and computer program product include determining historical execution characteristics of the application based on the monitored performance and one or more system characteristics of a node on which the application was executed on. The method, system, and computer program product also include incorporating the historical execution characteristics into executable file for the application, such that the historical execution characteristics can be used to manage subsequent executions of the application.

BRIEF DESCRIPTION OF THE SEVERAL VIEWS OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

FIGS. 1A-1B illustrate a computing infrastructure configured to execute a stream computing application, according to one embodiment described herein.

DETAILED DESCRIPTION

Figure 2:
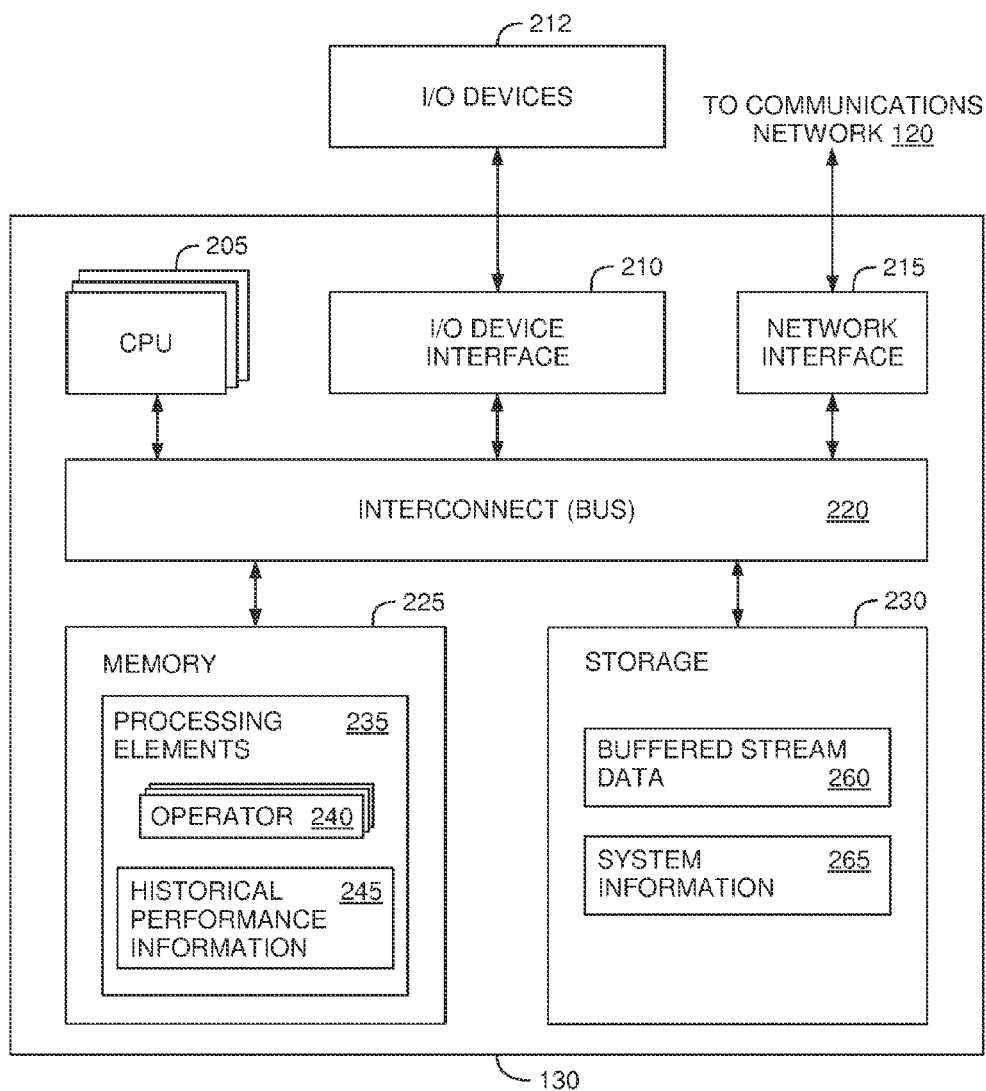
FIG. 2 is a more detailed view of the compute node of FIGS. 1A-1B, according to one embodiment described herein.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in milliseconds. Constructing an application using this type of processing has opened up a new programming paradigm that will allow for a broad variety of innovative applications, systems and processes to be developed, as well as present new challenges for application programmers and database developers.

In a stream computing application, operators are connected to one another such that data flows from one operator to the next (e.g., over a TCP/IP socket). Scalability is reached by distributing an application across nodes by creating many small executable pieces of code (i.e., processing elements), each of one which contains one or more processing modules (i.e., operators). These processing elements can also be replicated on multiple nodes with load balancing among them. Operators in a stream computing application can be fused together to form a processing element. Additionally, multiple processing elements can be grouped together to form a job. Doing so allows processing elements to share a common process space, resulting in much faster communication between operators than is available using inter-process communication techniques (e.g., using a TCP/IP socket). Further, processing elements can be inserted or removed dynamically from an operator graph representing the flow of data through the stream computing application.

One advantage of stream computing applications is that they allow the user to granularly control the process flow of data through the application. In other words, the user may designate specific operators to perform various operations on the incoming data, and may dynamically alter the stream computing application by modifying the operators and the order in which they are performed. Additionally, stream computing applications are able to handle large volumes of data.

However, because stream computing applications often deal with large volumes of data, the processing of which is spread over multiple processing elements across multiple compute nodes, an operator may need to produce an output faster than it is able. Instead of requiring an operator to generate output data by processing currently received input data, an operator may instead output predetermined data. This predetermined data may be based on, for example, an average of the output data that was previously processed and transmitted by the operator. Moreover, the operator may only transmit predicted output data if the previously processed output data falls within an acceptable range. That is, if the previous output data is deterministic. An operator, or data flowing out of the operator, is "deterministic" if the values of the output data can be predicted with some minimum amount of confidence. For example, output data may be predictable or deterministic because a certain input always yields a certain output or because the output data typically has a value within a certain range—e.g., the output values for an operator are within a predefined range 80% of the time. Once the output data is deemed deterministic, using the predicted output data may allow the operator to transmit output data faster, or with less processing, than it otherwise would be able.

Moreover, the operator may output predetermined data only if there is a need to limit or stop processing received input data. For example, the stream computing application may be experiencing backpressure. "Backpressure" is a term used to describe one or more operators that are unable to transmit or receive additional data because either their buffer or a buffer associated with a downstream operator is full. In the case of some real-time applications, the operator may trade accuracy for increased data throughput where the time required for data to propagate through the stream computing application is an important factor.

One advantage of stream computing application is that processing elements can be quickly moved into and out of the operator graph. As such, it may optimal in particular stream computing applications for certain processing elements to be offline until the processing elements are needed. However, because the operators within these processing elements have a requisite amount of data that must be received from one or more upstream operators before the operators can begin generating output data, there may be a delay once the processing elements are started before the operators within the processing elements can generate meaningful output or even output values at all.

One consideration in stream computing, or more generally in any distributed computing application, is the deployment of a particular executable on a suitable node. That is, certain applications (e.g., a processing element in a stream computing application) may perform optimally on certain configurations of hardware and software and particular applications may not operate at all without certain minimum hardware and software requirements. As such, embodiments provide techniques for managing execution of a processing element are described. Embodiments may receive a first processing element for deployment. Here, the first processing element is an executable application that encapsulates performance information describing execution characteristics of the executable application. Additionally, system information for each of a plurality of nodes may be retrieved. Embodiments may then select one or the plurality of nodes to deploy the received first processing element to based on the retrieved system information and the execution characteristics. The first processing element may then be deployed for execution on the selected node. Doing so enables the processing element to be deployed to a suitable node for execution without requiring any additional information beyond the executable application.

Additionally, embodiments may use the historical performance information within the executable application (or portions of a stream computing application—e.g., within a processing element) for other deployment-related functions. For instance, embodiments may use the performance information together with the system information for the node on which the application is deployed in order to predict problems with the application before the problems arise. For example, if embodiments detect the workload on the node has substantially increased such that the node no longer meets specifications defined by the historical performance information, embodiments could determine that the application is likely to experience problems running on the current node unless some remedial action is taken. As another example, embodiments could use the historical performance information to determine that the application is not currently performing as efficiently as it has on previous executions. Embodiments could perform one or more remedial actions, such as generating a notification to an administrator of the system or altering the deployment of the application. For instance, embodiments could migrate a portion of the application (e.g., a processing element) to a different, more suitable node within the distributed computing system. As another example, if the application is a processing element within a stream computing application, embodiments could clone a second instance of the processing element onto another, different node within the distributed computing system and could modify an operator graph for the stream computing application to load balance between the two processing elements. Advantageously, doing so allows potential problems within a distributed environment to be detected and corrected, oftentimes before an actual problem arises.

FIGS. 1A-1B illustrate a computing infrastructure configured to execute a stream computing application, according to one embodiment of the invention. As shown, the computing infrastructure 100 includes a management system 105 and a plurality of compute nodes $13_{0_{1-4}}$, each connected to a communications network 120. Also, the management system 105 includes an operator graph 132 and a stream manager 134. As described in greater detail below, the operator graph 132 represents a stream computing application beginning from one or more source processing elements (PEs) through to one or more sink PEs. This flow from source to sink is also generally referred to herein as an execution path. However, an operator graph may be a plurality of linked together executable units (i.e., processing elements) with or without a specified source or sink. Thus, an execution path would be the particular linked together execution units that data traverses as it propagates through the operator graph.

Generally, data attributes flow into a source PE of a stream computing application and are processed by that PE. Typically, processing elements receive an N-tuple of data attributes from the stream as well as emit an N-tuple of data attributes into the stream (except for a sink PE where the stream terminates). Of course, the N-tuple received by a processing element need not be the same N-tuple sent downstream. Additionally, the processing elements could be configured to receive or emit data in formats other than a tuple (e.g., the processing elements could exchange data marked up as XML documents). Furthermore, each processing element may be configured to carry out any form of data processing functions on the received tuple, including, for example, writing to database tables or performing other database operations such as data joins, splits, reads, etc., as well as performing other data analytic functions or operations.

The stream manager 134 may be configured to monitor a stream computing application running on the compute nodes $130_{1-4}$, as well as to change the structure of the operator graph 132. The stream manager 134 may move processing elements (PEs) from one compute node 130 to another, for example, to manage the processing loads of the compute nodes 130 in the computing infrastructure 100. Further, stream manager 134 may control the stream computing application by inserting, removing, fusing, un-fusing, or otherwise modifying the processing elements (or what data-tuples flow to the processing elements) running on the compute nodes $130_{1-4}$. One example of a stream computing application is IBM®'s InfoSphere® Streams (note that InfoSphere® is a trademark of International Business Machines Corporation, registered in many jurisdictions worldwide).

FIG. 1B illustrates an example operator graph that includes ten processing elements (labeled as PE1-PE10) running on the compute nodes $130_{1-4}$. Of note, because a processing element is a collection of fused operators, it is equally correct to describe the operator graph as execution paths between specific operators, which may include execution paths to different operators within the same processing element. FIG. 1B illustrates execution paths between processing elements for the sake of clarity. While a processing element may be executed as an independently running process with its own process ID (PID) and memory space, multiple processing elements may also be fused to run as single process or job (with a PID and memory space). In cases where two (or more) processing elements are running independently, inter-process communication may occur using a "transport" (e.g., a network socket, a TCP/IP socket, or shared memory). However, when processes are fused together, the fused processing elements can use more rapid communication techniques for passing tuples (or other data) among processing elements (and operators in each processing element).

As shown, the operator graph begins at a source 135 (that flows into the processing element labeled PE1) and ends at sink $140_{1-2}$ (that flows from the processing elements labeled as PE6 and PE10). Compute node $130_1$ includes the processing elements PE1, PE2 and PE3. Source 135 flows into the processing element PE1, which in turn emits tuples that are received by PE2 and PE3. Of note, although the operators within the processing elements are not shown in FIG. 1B, in one embodiment the data tuples flow between operators within the processing elements rather than between the processing elements themselves. For example, one or more operators within PE1 may split data attributes received in a tuple and pass some data attributes to one or more other operators within PE2, while passing other data attributes to one or more additional operators within PE3. Data that flows to PE2 is processed by the operators contained in PE2, and the resulting tuples are then emitted to PE4 on compute node $130_2$. Likewise, the data tuples emitted by PE4 flow to sink PE6 $140_1$. Similarly, data tuples flowing from PE3 to PE5 (i.e., from operator(s) within PE3 to operator(s) within PE5) also reach sink PE6 $140_1$. Thus, in addition to being a sink for this example operator graph, PE6 could be configured to perform a join operation, combining tuples received from PE4 and PE5. This example operator graph also shows data tuples flowing from PE3 to PE7 on compute node $130_3$, which itself shows data tuples flowing to PE8 and looping back to PE7. Data tuples emitted from PE8 flow to PE9 on compute node $130_4$, which in turn emits tuples to be processed by sink PE10 $140_2$.

Furthermore, although embodiments of the present invention are described within the context of a stream computing application, this is not the only context relevant to the present disclosure. Instead, such a description is without limitation and is for illustrative purposes only. Of course, one of ordinary skill in the art will recognize that embodiments of the present invention may be configured to operate with any computer system or application capable of performing the functions described herein. For example, embodiments of the invention may be configured to operate in a clustered environment with a standard database processing application.

FIG. 2 is a more detailed view of the compute node 130 of FIGS. 1A-1B, according to one embodiment of the invention. As shown, the compute node 130 includes, without limitation, at least one CPU 205, a network interface 215, an interconnect 220, a memory 225, and storage 230. The compute node 130 may also include an I/O devices interface 210 used to connect I/O devices 212 (e.g., keyboard, display and mouse devices) to the compute node 130.

Each CPU 205 retrieves and executes programming instructions stored in the memory 225. Similarly, the CPU 205 stores and retrieves application data residing in the memory 225. The interconnect 220 is used to transmit programming instructions and application data between each CPU 205, I/O devices interface 210, storage 230, network interface 215, and memory 225. CPU 205 is included to be representative of a single CPU, multiple CPUs, a single CPU having multiple processing cores, and the like. The memory 225 is generally included to be representative of a random access memory (e.g., DRAM or Flash). Storage 230, such as a hard disk drive, solid state disk (SSD), or flash memory storage drive, may store non-volatile data.

In this example, the memory 225 includes a plurality of processing elements 235. The processing elements 235 include a collection of operators 240 and historical performance information 245. The historical performance information 245 generally represents data collected from previous executions of the respective processing element 235 on one of the nodes 130 of the stream computing system. For example, historical performance information 245 could specify system characteristics of compute nodes on which the respective processing element 235 has been successfully executed and could further specify system characteristics of computer node on which the respective processing element 235 did not execute successfully. Such characteristics may include, without limitation, hardware attributes of the compute nodes (e.g., processor type, processor count, memory type, amount of memory, etc.), software attributes of the compute nodes (e.g., applications installed on the compute nodes, versions of the applications, etc.) and performance characteristics of the compute nodes (e.g., system workload, network load, etc.).

Additionally, as noted above, each operator 240 may provide a small chunk of executable code configured to process data flowing into a processing element (e.g., PE 235) and to emit data to other operators 240 in that PE and to other processing elements in the stream computing application. Such processing elements may be on the same compute node 130 or on other compute nodes accessible over the data communications network 120. Memory 225 may also contain stream connection data (not shown) which represents the connections between PEs on compute node 130 (e.g., a TCP/IP socket connection between two separate PEs 235), as well as connections to other compute nodes 130 with upstream and or downstream PEs in the stream computing application, also via TCP/IP sockets (or other inter-process data communication mechanisms).

As shown, storage 230 contains buffered stream data 260 and system information 265. The buffered stream data 260 represents a storage space for data flowing into the compute node 105 from upstream processing elements (or from a data source for the stream computing application). For example, buffered stream data 260 may include data tuples waiting to be processed by one of the PEs 235—i.e., a buffer. Buffered stream data 260 may also store the results of data processing performed by processing elements 235 that will be sent to downstream processing elements. For example, a PE 235 may have to store tuples intended for a downstream PE 235 if that PE 235 already has a full buffer, which may occur when the operator graph is experiencing backpressure. The system information 265 generally specifies characteristics of the compute node 130. Such characteristics may include, without limitation, hardware attributes of the compute node (e.g., processor type, processor count, memory type, amount of memory, etc.), software attributes of the compute node (e.g., applications installed on the compute nodes, versions of the applications, etc.) and performance characteristics of the compute node (e.g., system workload, network load, etc.).

Figure 3:
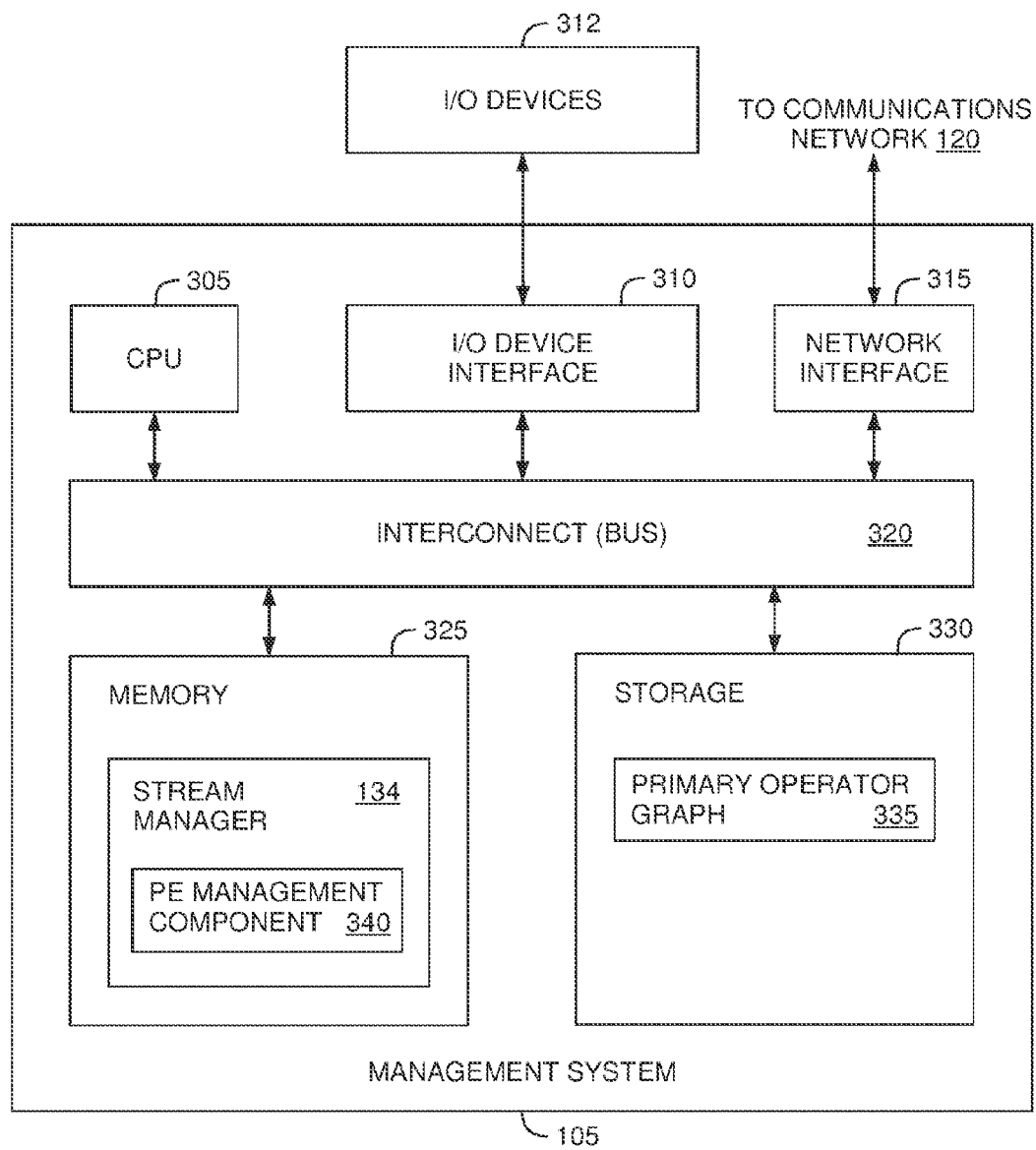
FIG. 3 is a more detailed view of the server computing system of FIG. 1, according to one embodiment described herein.

FIG. 3 is a more detailed view of the server computing system 105 of FIG. 1, according to one embodiment of the invention. As shown, server computing system 105 includes, without limitation, a CPU 305, a network interface 315, an interconnect 320, a memory 325, and storage 330. The client system 130 may also include an I/O device interface 310 connecting I/O devices 312 (e.g., keyboard, display and mouse devices) to the server computing system 105.

Like CPU 205 of FIG. 2, CPU 305 is configured to retrieve and execute programming instructions stored in the memory 325 and storage 330. Similarly, the CPU 305 is configured to store and retrieve application data residing in the memory 325 and storage 330. The interconnect 320 is configured to move data, such as programming instructions and application data, between the CPU 305, I/O devices interface 310, storage unit 330, network interface 305, and memory 325. Like CPU 205, CPU 305 is included to be representative of a single CPU, multiple CPUs, a single CPU having multiple processing cores, and the like. Memory 325 is generally included to be representative of a random access memory. The network interface 315 is configured to transmit data via the communications network 120. Although shown as a single unit, the storage 330 may be a combination of fixed and/or removable storage devices, such as fixed disc drives, removable memory cards, optical storage, SSD or flash memory devices, network attached storage (NAS), or connections to storage area-network (SAN) devices.

As shown, the memory 325 stores a stream manager 134 configured with a PE management component 340. Additionally, the storage 330 includes a primary operator graph 335. The stream manager 134 may use the primary operator graph 335 to route tuples to PEs 235 for processing. The stream manager 134 also includes a predictive startup component 340. Generally, the PE management component 340 is configured to select one of the compute nodes 130 in the stream computing system on which to deploy a particular processing element 235, based on historical performance information 245 within the executable file for the processing element 235. For example, the PE management component 340 could retrieve the historical performance information 245 from the executable for the processing element 235 and could further retrieve the system information 265 from each of the compute nodes 130 within the stream computing environment. The PE management component 340 could then use the historical performance information 245 and the retrieved system information 265 to select a suitable compute node 130 on which to deploy the particular processing element 235. Doing so allows for processing elements to be deployed on suitable compute nodes without requiring any additional information beyond the executable application for the processing element and system information describing characteristics of the compute nodes.

Additionally, the PE management component 340 could use the historical performance information 245 within the processing element 235 to predict problems with the execution of the processing element 235, and oftentimes may do so before any problems actually arise. For example, the PE management component 340 could monitor system information 265 for the compute node 130 on which the processing element 235 is deployed in order to detect when the compute node 130 no longer matches the system attributes of other compute nodes that have successfully executed the processing element previously, as specified in the historical performance data. Upon detecting that the attributes no longer match, the PE management component 340 could perform a remedial action for the processing element 235. For example, the PE management component 340 could generate a notification to a system administrator describing the potential problem. As another example, the PE management component 340 could adjust the operator graph for the stream computing application in order to reduce the load on the processing element 235. Advantageously, doing so allows for potential problems within the stream computing application to be detected and resolved before any actual problems arise.

Figure 4A:
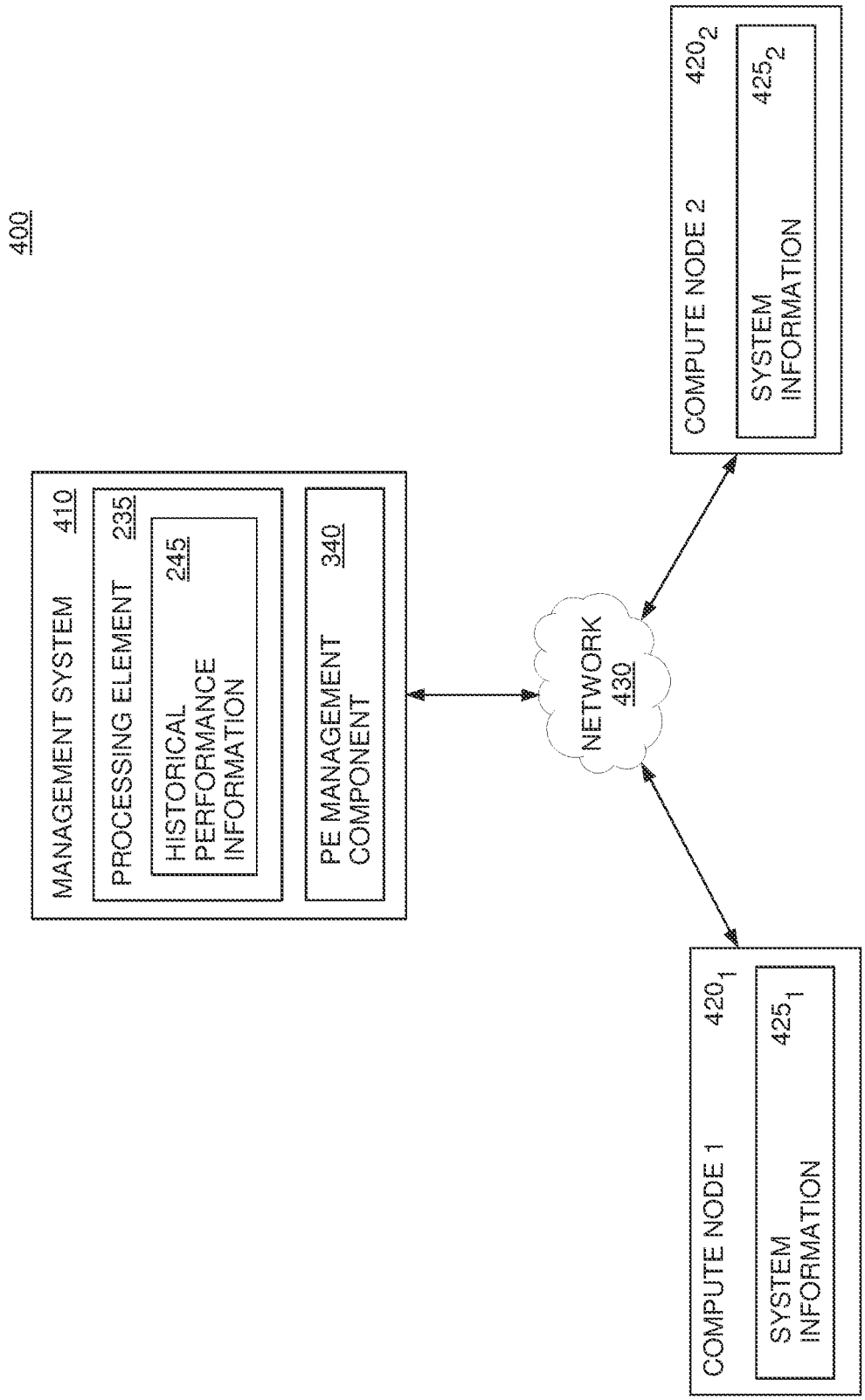
FIGS. 4A-B are diagrams illustrating systems configured with a PE management component, according to embodiments described herein.
Figure 4B:
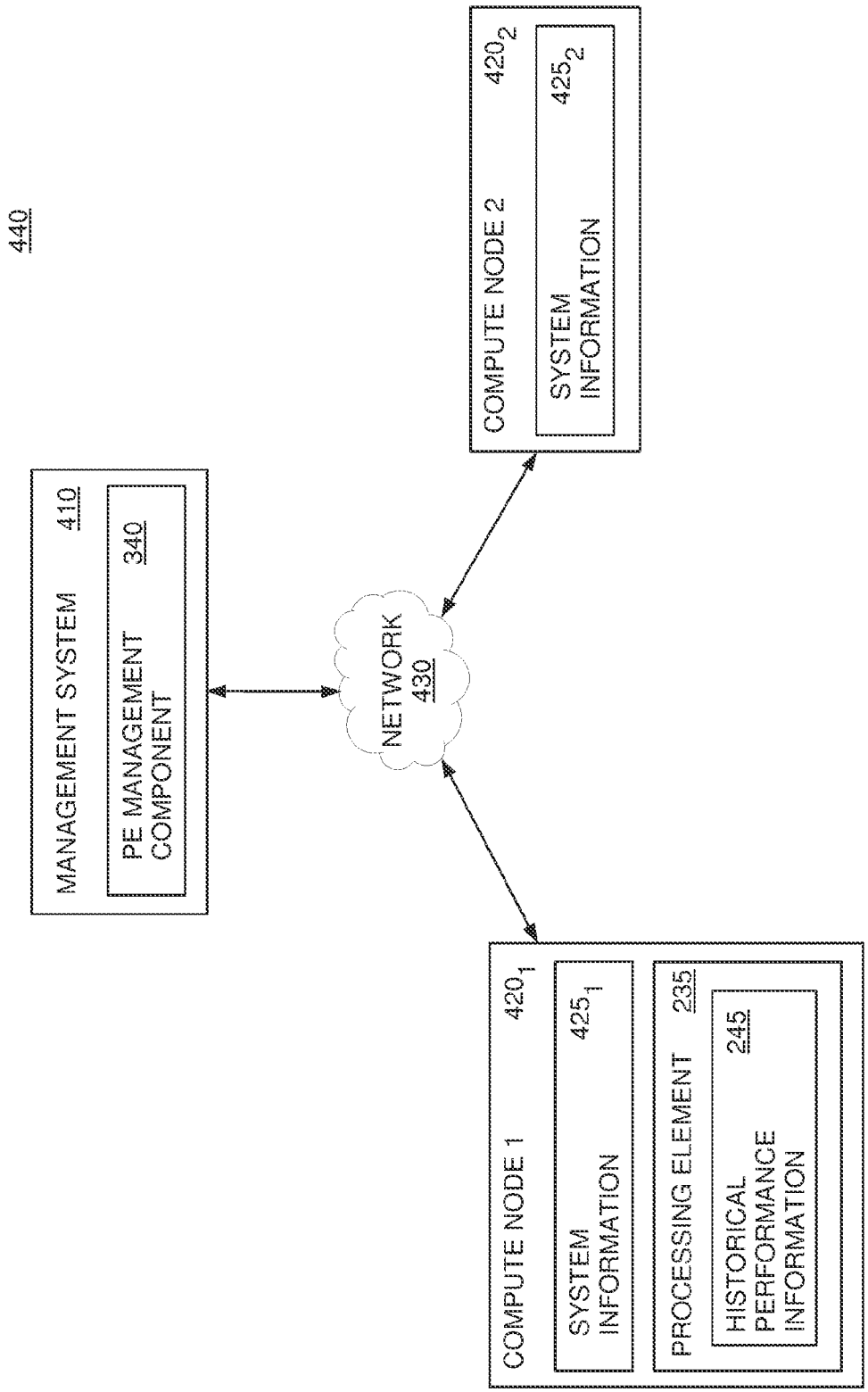

FIGS. 4A-B are diagrams illustrating systems configured with a PE management component, according to embodiments described herein. As shown in FIG. 4A, the system 400 includes a management system 410 and compute nodes $420_{1-2}$, connected via a network 430. The management system 410 includes a processing element 235 for deployment onto one of compute nodes $420_{1-2}$ and a PE management component 340. The processing element executable 235 includes historical performance information 245. As discussed above, the historical performance information 245 generally specifies characteristics of compute nodes on which the processing element 235 has previously been executed on. Additionally, the processing element 235 may include one or more operators (not shown), each of which may provide a small chunk of executable code configured to process data flowing into the processing element 235 and to emit data to other operators in that PE 235 and to other processing elements in the stream computing application.

Additionally, each of the compute nodes $425_{1-2}$ includes system information $425_{1-2}$. As discussed above, the system information $425_{1-2}$ represents data describing characteristics of the respective compute node $420_{1-2}$. Such characteristics may include, without limitation, hardware attributes of the compute node (e.g., processor type, processor count, memory type, amount of memory, etc.), software attributes of the compute node (e.g., applications installed on the compute nodes, versions of the applications, etc.) and performance characteristics of the compute node (e.g., system workload, network load, etc.).

In the depicted example, the PE management component 340 is configured to select one of the compute nodes $420_{1-2}$ to deploy the processing element 235 to using the historical performance information 245 within the processing element executable 235. For example, the historical performance information 245 could specify that the processing element 235 has successfully been deployed on nodes having 4 gigabytes of available memory, but that the processing element 235 experienced problems when running on nodes having 1 gigabyte of available memory. If the PE management component 340 then determines that the compute node $420_1$ has 8 gigabytes of available memory (i.e., based on the system information $425_1$) while the compute node $420_2$ only has 512 megabytes of available memory (i.e., based on the system information $425_2$), the PE management component 340 could determine that only the compute node $420_1$ is suitable for deploying the processing element 235 to.

Based on this determination, the PE management component 340 could then deploy the processing element 235 to the compute node $420_1$. An example of this is shown in the FIG. 4B. Similar to the FIG. 4A, the system 440 includes a management system 410 and compute nodes $420_{1-2}$, connected via a network 430. The management system 410 includes a PE management component 340. The processing element executable 235 includes historical performance information 245. As discussed above, the historical performance information 245 generally specifies characteristics of compute nodes on which the processing element 235 has previously been executed on. Additionally, the processing element 235 may include one or more operators (not shown), each of which may provide a small chunk of executable code configured to process data flowing into the processing element 235 and to emit data to other operators in that PE 235 and to other processing elements in the stream computing application. Additionally, each of the compute nodes $425_{1-2}$ includes system information $425_{1-2}$. As discussed above, the system information $425_{1-2}$ represents data describing characteristics of the respective compute node $420_{1-2}$.

In the depicted system 440, the PE management component 340 has selected the compute node $420_1$ and accordingly has deployed the processing element 235 (which includes the historical performance information 245) to the compute node $420_1$. As discussed above, the PE management component 340 can also be configured to use the historical performance information 245 within the processing element 235 together with the system information $425_1$ to detect potential problems with executing the processing element 235 on the compute node $420_1$. For example, the PE management component 340 could detect that the workload of the compute node $420_1$ has increased since the processing element 235 was deployed to the node $420_1$. If the PE management component 340 then determines that the workload of the compute node $420_1$ exceeds a threshold amount of workload for a system running the processing element 235 specified in the historical performance information 245, the PE management component 340 could perform a remedial action for the processing element 235.

For example, one such remedial action by the PE management component 340 could be spawning a second instance of the processing element 235 on the compute node $420_2$. The PE management component 340 could then update the operator graph for the stream computing application to load balance between the processing element 235 and the second instance of the processing element. Doing so helps to alleviate the workload on the processing element 235 and thus may avoid any actual problems caused by the increased workload on the node $420_1$ from occurring. Additionally, embodiments may do so without requiring any additional information beyond the processing element 235 executable and information (e.g., system information $425_{1-2}$) describing characteristics of the compute nodes $420_{1-2}$.

As another example of a remedial action, upon determining a potential problem exists with the processing element 235 executing on the compute node $420_1$ based on the historical performance information 245 and the system information $425_1$, the PE management component 340 could select a new compute node 420 that is suitable to execute that the processing element 235. For purposes of the present example, assume that the PE management component 340 analyzes the historical performance information 245 and the system information $425_2$ and determines that the compute node $420_2$ is suitable for hosting the processing element 235. The PE management component 340 could then terminate the processing element 235 executing on the compute node $420_1$ and could spawn a new instance of the processing element 235 on the compute node $420_2$. The PE management component 340 could then update the operator graph to account for the newly created instance of the processing element 235 running on the compute node $420_2$. Advantageously, doing so migrates the processing element 235 to a suitable node upon detecting a potential problem exists with the processing element's 235 current execution environment and may even do so before any actual problems with the processing element 235 arise.

Figure 5:
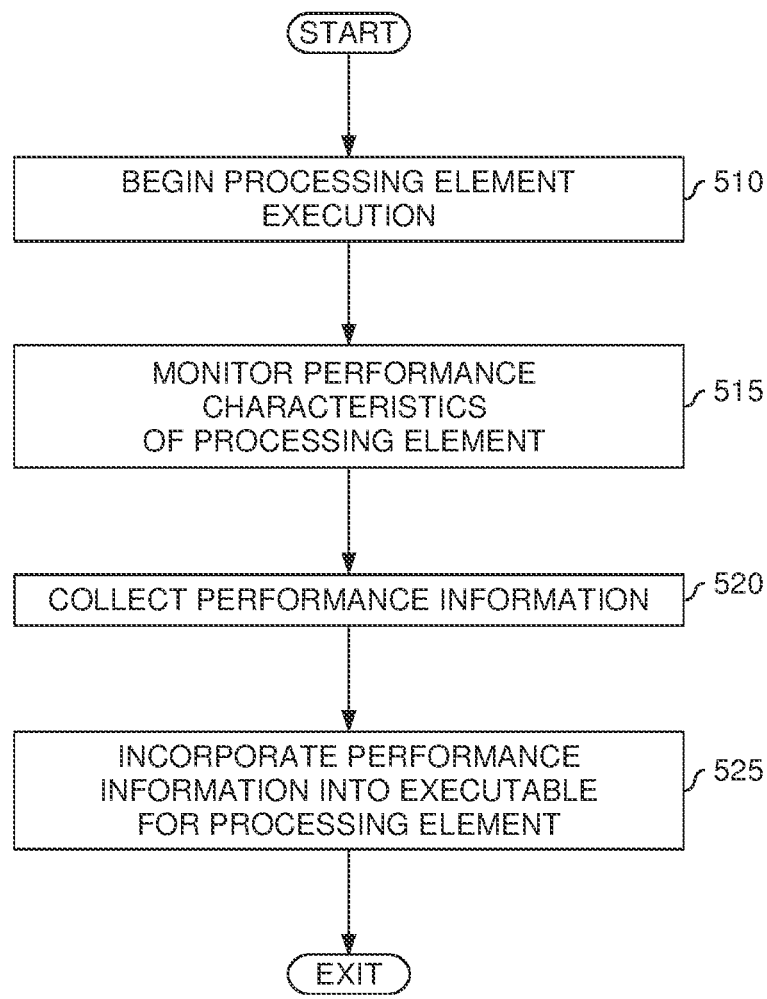
FIG. 5 is a flow diagram illustrating a method for incorporating performance information into an executable, according to one embodiment described herein.

FIG. 5 is a flow diagram illustrating a method for incorporating performance information into an executable, according to one embodiment described herein. As shown, the method 510 begins at step 510, where a processing element begins execution on a first compute node in a stream computing environment. The PE management component 340 then monitors performance characteristics of the processing element executing on the first compute node (step 515) and collect performance information for the processing element (step 520). For example, the PE management component 340 could monitor a rate at which the processing element receives tuples of data from upstream processing elements and a rate at which the processing element processes incoming tuples of data. The PE management component 340 could later use such information to, for instance, determine whether the processing element is accumulating a backlog of data to process. That is, if the processing element is receiving more tuples of data than the processing element can process in a given amount of time, the PE management component 340 could determine that the processing element is underperforming on the first compute node.

Additionally, the PE management component 340 could monitor characteristics of the compute node on which the processing element is executing. For example, such characteristics could include a type of processor on the compute node, a number of processors on the node, an amount of memory on the node, the type of the memory, an amount of storage on the node, the type of storage, network connectivity characteristics (e.g., network connections, network speed, network congestion, etc.), and system workload (e.g., processor usage, memory usage, etc.). The PE management component 340 could then use such information to determine whether other compute nodes are suitable for the processing element to execute on. For example, assume that the PE management component 340 determines the compute node on which the processing element is currently executing has 2 gigabytes of memory and that the processing element is currently executing without any problems (e.g., no data backlog is accumulating, no errors or exceptions being generated, etc.). Accordingly, the PE management component 340 could determine that other systems having at least 2 gigabytes of memory could be suitable for executing the processing element. Furthermore, such system data may be collected over an extended period of time during which the processing element is executed across multiple compute nodes, so that the system specifications for suitable execution can be more precisely defined.

The PE management component 340 then incorporates the collected performance information into the executable file for the processing element (step 525) and the method 500 ends. For example, the PE management component 340 could store the collected performance using a plurality of global variables in the source code for the processing element and could then compile the source code to create the executable file for the processing element. Advantageously, by incorporating the historical performance information into the executable for the processing element, embodiments enable the processing element to select a node on which it can be successfully deployed onto. Additionally, the processing element could even use the incorporated performance information to detect potential problems that may arise during the execution of the processing element.

Figure 6:
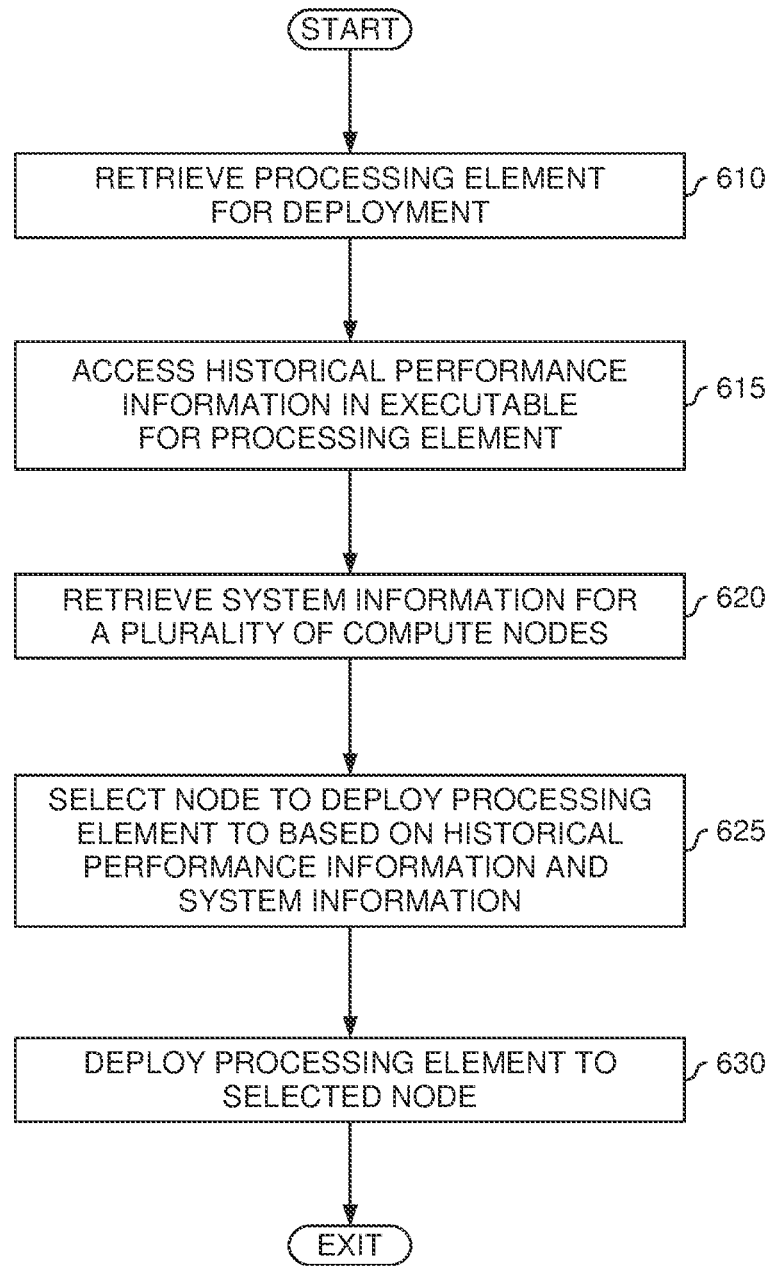
FIG. 6 is a flow diagram illustrating a method for deploying a processing element, according to one embodiment described herein.

FIG. 6 is a flow diagram illustrating a method for deploying a processing element, according to one embodiment described herein. As shown, the method 600 begins at step 610, where the PE management component 340 receives a processing element for deployment on one or more nodes in a stream computing environment. The PE management component 340 accesses historical performance data stored in the executable file for the processing element (step 615). For example, such historical performance data could be collected and incorporated into the executable using the method 500 shown in FIG. 5 and discussed above in the corresponding text. Additionally, as discussed above, the historical performance information generally specifies characteristics of other compute nodes on which the received processing element has previously been executed on and how the processing element performed when executed on the other compute nodes.

The PE management component 340 also retrieves system information for each of a plurality of compute nodes (step 620). As discussed above, the system information represents data describing characteristics of the respective compute node. Such characteristics may include, without limitation, hardware attributes of the compute node (e.g., processor type, processor count, memory type, amount of memory, etc.), software attributes of the compute node (e.g., applications installed on the compute nodes, versions of the applications, etc.) and performance characteristics of the compute node (e.g., system workload, network load, etc.).

In the depicted embodiment, the PE management component 340 then selects a node on which to deploy the processing element based on the historical performance information and the system information (step 625). For example, the PE management component 340 could analyze the historical performance information to determine a set of system specifications needed to run the processing element (e.g., based on the system specifications of systems where the processing element has been successfully executed and further based on the system specifications of systems where the processing element was not successfully executed) and could compare this information against the system information for each of the compute nodes in order to determine a suitable node to deploy the processing element to. The PE management component 340 then deploys the processing element to the selected node (step 630) and the method 600 ends.

In the preceding, reference is made to embodiments of the invention. However, the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a stream computing application configured with a PE management component could execute across one or more nodes within the cloud. The PE management component within the stream computing application could retrieve a first processing element for deployment and could access historical performance information within the first processing element. The PE management component could further retrieve system information for each of a plurality of nodes within the cloud and could reference the system information together with the historical performance data in order to determine a suitable node onto which to deploy the processing element. Doing so helps to ensure optimal node placement for processing elements within a stream computing application which users may access from any computing system attached to a network connected to the cloud (e.g., the Internet).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations, can be implemented by special-purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method for incorporating performance data into an executable file for an application, comprising:
    monitoring performance of the executable file for the application while the executable file is executing on a node;
    determining the performance data of the application based on the monitored performance and one or more system characteristics of the node;
    incorporating the performance data into the executable file for the application for subsequent retrieval from the executable file, further comprising:
        storing the performance data in a plurality of global variables in a source code for the application; and
        compiling the source code including the performance data stored in the plurality of global variables to create the executable file for the application, such that the performance data can subsequently be retrieved from the executable file;
    deploying the executable file containing the incorporated performance data for the application to a first node for execution;
    retrieving the performance data from the executable file for use in managing the execution of the executable file: and
    performing a remedial action for the deployed application, upon determining that a potential workload overflow problem exists for the deployed application based on s stem information describing attributes of the first node and the retrieved performance data.

2. The method of claim 1, wherein the application is a processing element in a stream computing application, and further comprising:
    retrieving system information for each of a plurality of nodes inclusive of the node;
    selecting one or the plurality of nodes to deploy the processing element based on the retrieved system information and the performance data incorporated into the executable file for the processing element; and
    deploying the processing element for execution on the selected node.

3. The method of claim 2, wherein the processing element is deployed alongside a plurality of other processing elements, and further comprising:
    establishing an operator graph of the plurality of other processing elements and the deployed processing element, the operator graph defining at least one execution path and wherein at least one of the processing elements of the operator graph is configured to receive data from at least one upstream processing element and transmit data to at least one downstream processing element.

4. The method of claim 1, wherein the performance data include at least one of: a processor type, a number of processors, an amount of memory, a type of memory, a type of storage, one or more network connectivity characteristics, and a measure of system workload.

5. The method of claim 1, further comprising:
determining a number of instances of the application that should be created, based on system information for systems on which the instances of the application will be executed and further based on the performance data; and
creating the determined number of instances of the application on the systems, such that load can be balanced between the created instances of the application.

6. The method of claim 1, wherein performing a remedial action includes at least one of:
   (i) spawning a second instance of the application on a second node and discarding the deployed executable file on the first node,
   (ii) migrating the deployed executable file on the first node to a second node,
   (iii) modifying an operator graph to reduce a workload of the deployed executable file, and
   (iv) modifying one or more operations performed by the deployed executable file.

7. The method of claim 1, further comprising:
generating a status notification for the deployed executable file, the status notification indicating a current amount of workload for the executable file and a maximum amount of workload for the executable file, based on current workload information for the first node, the system information describing the attributes of the first node and the performance data incorporated into the executable file.

* * * * *